Jan. 25, 1944.   E. B. PECK   2,339,941
CHEMICAL PROCESS
Filed Aug. 5, 1939
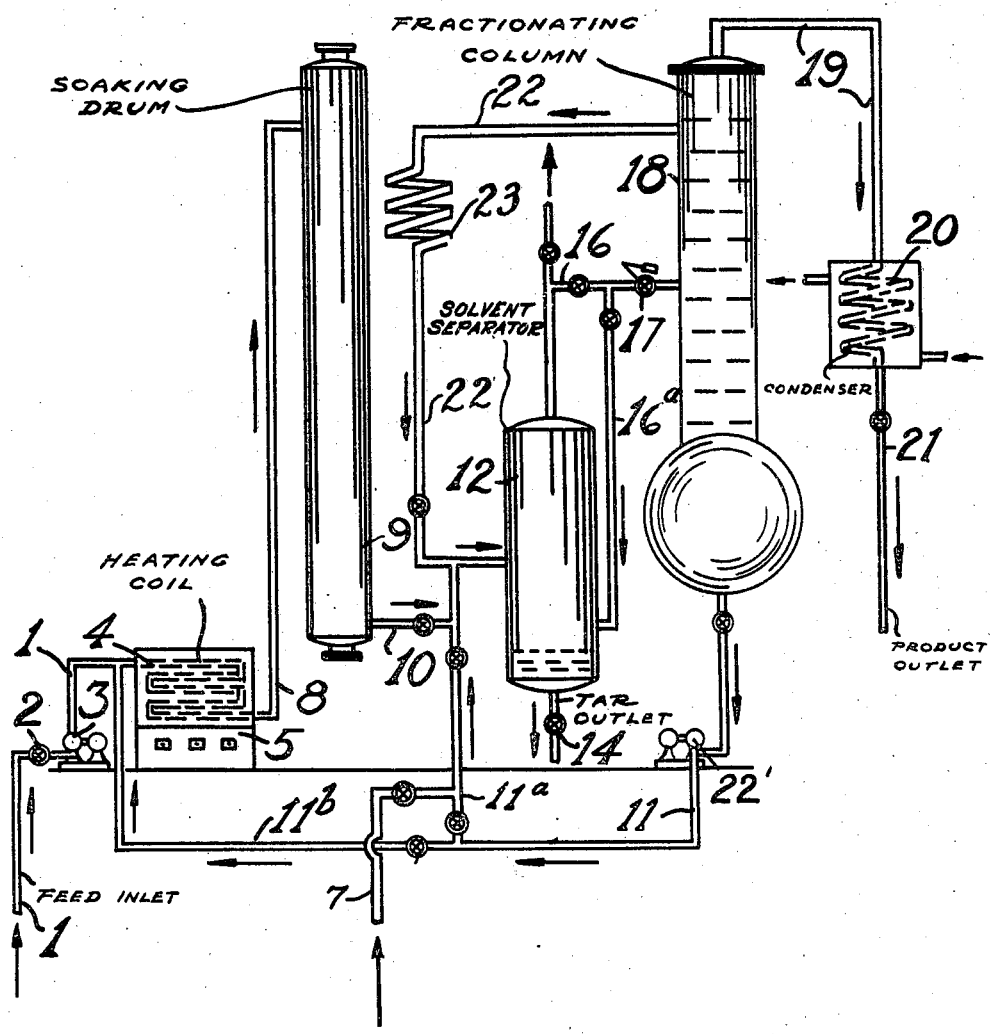
Edward B. Peck Inventor
By P. L. Young Attorney Patented Jan. 25, 1944

2,339,941

UNITED STATES PATENT OFFICE 2,339,941

CHEMICAL PROCESS

Edward B. Peck, Elizabeth, N. J., assignor to Standard Oil Development Company, a corporation of Delaware Application August 5, 1939, Serial No. 288,478

5 Claims. (Cl. 196—50)

This invention relates to an improved method of effecting a separation of the products of a petroleum hydrocarbon conversion process into relatively clean desirable products and relatively highly carbonaceous products.

In the thermal cracking process, the resulting products are separated into clean and highly carbonaceous products by vaporization of the products, followed by fractionation of the resulting vapors to effect the desired separation. In such a process, an appreciable portion of relatively clean products is at all times left in admixture with the highly carbonaceous residues which are ordinarily removed from the process and disposed of as inferior material.

In the thermal cracking of hydrocarbons, there are formed two liquid phases in addition to a gas phase. The liquid phases consist of a heavy liquid phase which is dispersed in a lighter liquid phase or in other words, there probably exists a colloidal suspension of the heavier liquid in lighter liquid. This heavier liquid eventually condenses to polymer and finally to coke upon continued cracking.

Inability to control phase separation has been one of the greatest difficulties in the development of certain types of cracking processes, particularly those operating at a high pressure, due to the formation of coke in the various transfer lines where sufficient cooling takes place for phase separation, or conditions of expansion take place which possibly favor the coagulation or separation of a second phase. In order to control or prevent this separation of phases in the reactor and the transfer lines and thereby control coke formation and improve the quality of hydrocarbon material which has been processed, but which is returned to the reaction vessel for further treatment, this invention proposes to contact the product leaving the reaction vessel with such a volume of cracked naphtha and/or cycle gas oil and at such temperature and pressure as required to separate in a separation zone the heavy liquid phase in the concentration and amount required for optimum operation, and under conditions at which the heavy tar-forming substances may be removed from the system before it forms coke.

It is a principal object of this invention therefore to combine the cracking of relatively heavy hydrocarbons with solvent extraction in which the crude naphtha and/or cycle gas oil produced by the cracking operation is recycled and combined with the cracked material passing from the reaction vessel under proper conditions of temperature, pressure, and relative proportions to give phase separation in which the heavy tarry coke-forming fractions separate out from the mixture to form a separate phase.

A second feature or object of the present invention resides in the use of heavier or higher-boiling fractions than have been used heretofore. Thus, where a light naphtha is employed instead of say propane or butane as a tar separating agent, heat may be conserved. Thus, the separator in which the tar is removed from the rest of the oil may operate at temperatures as high as 600° F. or higher whereas where butane is employed as a tar precipitant, the temperature must be lowered to a range of from about 125° F. to 150° F. This present process results in greater thermal efficiency since unlike processes employing propane or butane, the present process permits fractionation of the clean stock without heating the same.

The accompanying drawing represents diagrammatically, and in partial section, an elevational view of a combination of apparatus in which the present invention may be carried out.

Referring more particularly to the details of the apparatus, I represents feed line connecting to a source of some hydrocarbon which it is desired to convert to other hydrocarbons, as by cracking, and which carries valve 2 and pump 3 which discharges material contained in line I through a coil 4 in a furnace 5 and thence through pipe 8 into a soaking drum 9. This drum operates under a pressure of about 1000 pounds gauge pressure and the hydrocarbon is heated in the coil sufficiently so that after passing through the soaker it will have an outlet temperature of about 850° F. The cracked material is withdrawn from the soaker through line 10 and is mixed with about 5 volumes of a light naphtha (from any source) which is introduced through lines 7 and 11 and 11a into line 10. The temperature of the naphtha is about 670° to 680° F. and the mixture has a temperature of about 700° F. to 800° F. This mixture is then introduced into tar separator 12 in which the heavy carbonaceous fractions contained in the material withdrawn from the soaking drum are separated out and settle to the bottom of the drum. The tar separator 12, like the soaking drum 9, operates under a pressure of about 1000 pounds gauge pressure. The amount of the dark-colored layer of oil containing the tarry products ordinarily on most stocks amounts to about 5% of the original charge. This layer is withdrawn through line 14. The remaining portion of the oil is transferred through line 16 to a fractionating column 18, or a portion may be returned through line 16a to the bottom of separator 12. A pressure-reducing valve 17 is positioned in line 16 with the result that the pressure in column 18 may be lowered to from about 150 to 200 pounds gauge. The overhead product is withdrawn through line 19 from the fractionating column 18, passed through condenser 20 and the condensed product may be withdrawn through line 21 and sent to finishing equipment (not shown) or a portion may be mixed with the bottoms from column 18 and used in separator 12 as a tar precipitant. The heavier fractions which collect at the bottom of fractionating column 18 are pumped to feed line 10 by pump 22' through line 11 and 11a in the case where heavy bottoms are mixed with the products in separator 12, or a portion may be transferred through line 11b to fresh feed pipe 1. In the case where a light naphtha is mixed with the products in separator 12, the naphtha may be withdrawn from tower 18 through line 22, condensed in coil 23, discharged into line 11a and thence passed into separator 12. As indicated, the naphtha may also be supplied through pipe 7 from some extraneous source.

The tarry residue withdrawn through line 14 from the separator is pressure reduced to recover naphtha and other light hydrocarbon oils. The overhead product obtained from this latter operation may be combined with the hydrocarbon material passing from the separator through line 16 and fractionated therewith in column 18.

The temperature employed in the coil 4 will, of course, vary with the type of conversion process and with the type of charge used. In like manner, due to the variability of the charge stock and the type of product desired and the degree of separation to be effected, no fixed temperature to cover every case can be given to be employed in the separating chamber 12. In general the solvent may be either the bottoms (e. g., a gas oil) or a side stream cut (light naphtha) from the tower 18 or it may be an extraneous oil replacing these fractions, i. e., fresh feed to the cracking units. The boiling range and gravity of the solvent will therefore be in large measure determined by the operation. In reforming naphthas the solvent may be a naphtha of boiling range 200°–450° and of A. P. I. gravity of 34 to 56, while in gas oil cracking the solvent may be a gas oil of boiling range 400°–700° and A. P. I. gravity of 25 to 34.

In the foregoing descriptions of one modification of the present invention, the application of the improvement to the so-called tube and tank method of oil cracking has been described. It is pointed out, however, that the present invention is applicable to produce clean stocks which are to be converted in any of the known processes.

To recapitulate, the present invention relates to a method of removing the constituents from the charging stock to a cracking process which, during the conversion process, forms carbonaceous materials which deposit on the inner walls of the various transfer lines employed in the process. It is a matter of record to employ light hydrocarbons, such as liquefied propane, butane, and other hydrocarbons having less than 5 carbon atoms for the purpose of precipitating out those constituents of a charging stock which tend to form coke and tar during the conversion operation, but this invention employs hydrocarbons containing more than 5 carbon atoms and preferably contains hydrocarbons boiling within the gas oil range or thereabouts.

It will be observed to those skilled in the particular art that numerous modifications of this invention may be made without departing from the spirit thereof.

I claim:

1. In the cracking of hydrocarbon oils, the improvement which comprises subjecting a hydrocarbon oil in a cracking zone to cracking temperatures while applying a sufficient pressure to maintain the oil in liquid phase, subjecting the oil to cracking conditions for a sufficient period of time to obtain the desired conversion, withdrawing the total product from the cracking zone and adding to said product while substantially at cracking zone outlet temperature, a normally liquid hydrocarbon oil having a boiling range not greater than 300° F., an initial boiling point of at least 200° F., and a final boiling point not over about 700° F., the said added oil being heated to a temperature sufficiently high and added in such quantity that the mixture will have a temperature of from about 700° F. to 800° F., discharging the mixture into a separation zone maintained under sufficient pressure to maintain the mixture in liquid phase, where the mixture separates into a heavy phase containing tar-forming constituents and an upper liquid lighter phase, withdrawing the tar-forming constituents from the separation zone, withdrawing the cracked products substantially free of tar-forming constituents from the separation zone, and recovering the desired products from the latter at a pressure substantially lower than that prevailing in the said separation zone.

2. The process set forth in claim 1, in which the cracked products and the added liquid hydrocarbon are at a temperature of about 700° F. in the separation zone.

3. The process set forth in claim 1, in which the hydrocarbon oil to be cracked is a gas oil and in which the cracked products are mixed with a gas oil prior to discharge into the separation zone.

4. The process set forth in claim 1, in which the cracked products are mixed with a gas oil, thence discharged into the separation zone where the tar separation takes place under a pressure of about 1000 lbs. per square inch gauge.

5. The method set forth in claim 1, in which the cracked products are mixed with a naphtha prior to discharge into the separation zone.

EDWARD B. PECK.